US 12,040,687 B2

(12) United States Patent
Nakatsuka et al.

(10) Patent No.: US 12,040,687 B2
(45) Date of Patent: Jul. 16, 2024

(54) POWER TOOL

(71) Applicant: MAKITA CORPORATION, Anjo (JP)

(72) Inventors: Takaharu Nakatsuka, Anjo (JP); Yuta Izutsu, Anjo (JP)

(73) Assignee: MAKITA CORPORATION, Anjo (JP)

(*) Notice: Subject to any disclaimer, the term of this patent is extended or adjusted under 35 U.S.C. 154(b) by 245 days.

(21) Appl. No.: 17/625,068

(22) PCT Filed: Jul. 27, 2020

(86) PCT No.: PCT/JP2020/028746
§ 371 (c)(1),
(2) Date: Jan. 5, 2022

(87) PCT Pub. No.: WO2021/065172
PCT Pub. Date: Apr. 8, 2021

(65) Prior Publication Data
US 2022/0286024 A1 Sep. 8, 2022

(30) Foreign Application Priority Data

Sep. 30, 2019 (JP) ................. 2019-178539

(51) Int. Cl.
H02K 7/14 (2006.01)
H02K 7/00 (2006.01)
H02K 7/116 (2006.01)
H02K 11/24 (2016.01)
(Continued)

(52) U.S. Cl.
CPC ............. *H02K 7/145* (2013.01); *H02K 7/003* (2013.01); *H02K 7/116* (2013.01); *H02K 7/14* (2013.01);
(Continued)

(58) Field of Classification Search
CPC ...... B25B 23/147; B25B 21/00; H02K 7/003; H02K 7/145; H02K 7/14; H02K 11/33;
(Continued)

(56) References Cited

U.S. PATENT DOCUMENTS

2005/0121209 A1* 6/2005 Shimizu ................. B25B 21/00
173/217
2006/0005637 A1 1/2006 Hirai et al.
(Continued)

FOREIGN PATENT DOCUMENTS

CN       1718373 A     1/2006
JP    H06-061465 U     8/1994
(Continued)

OTHER PUBLICATIONS

Ishino Yasushiro, Torque Control Tool, Nov. 11, 1997, JP H09292295 (English Machine Translation) (Year: 1997).*
(Continued)

*Primary Examiner* — Alexander A Singh
(74) *Attorney, Agent, or Firm* — Oliff PLC

(57) ABSTRACT

A power tool includes a motor including a rotor and a stator disposed around the rotor; an output shaft to which a tip tool is attached and that is rotated by power generated by the motor; a torque sensor unit that is disposed between the stator and the output shaft in a front-rear direction parallel to a rotation axis of the motor and that is coupled to the output shaft; an amplifier circuit that amplifies a detection signal of the torque sensor unit; and a housing including a motor housing part for housing the motor and a grip part. The torque sensor unit is disposed forward of the stator. The grip part is disposed downward of the motor housing part. The amplifier circuit is disposed upward of the grip part. The amplifier circuit is disposed forward of a rear end part of the stator.

20 Claims, 5 Drawing Sheets

(51) Int. Cl.
    *H02K 11/33*   (2016.01)
    *B25B 21/00*   (2006.01)
    *B25F 5/00*    (2006.01)
(52) U.S. Cl.
    CPC .............. *H02K 11/24* (2016.01); *H02K 11/33* (2016.01); *B25B 21/00* (2013.01); *B25F 5/001* (2013.01)
(58) Field of Classification Search
    CPC ......... H02K 11/24; H02K 7/116; B25F 5/008; B25F 5/001
    USPC ...................................................... 310/47, 50
    See application file for complete search history.

(56) References Cited

U.S. PATENT DOCUMENTS

| | | | |
|---|---|---|---|
| 2017/0274508 A1 | 9/2017 | Matsuoka et al. | |
| 2021/0078146 A1* | 3/2021 | Araki | B25F 5/001 |

FOREIGN PATENT DOCUMENTS

| | | | |
|---|---|---|---|
| JP | H09-019873 | A | 1/1997 |
| JP | H09-292295 | A | 11/1997 |
| JP | H09292295 | A  * | 11/1997 |
| JP | 2006-21272 | A | 1/2006 |
| JP | 2016-097460 | A | 5/2016 |
| JP | 6053086 | B1 | 12/2016 |
| JP | 2018-071557 | A | 5/2018 |
| JP | 2018-122429 | A | 8/2018 |

OTHER PUBLICATIONS

Mar. 1, 2023 Office Action issued in Chinese Patent Application No. 202080048457.3.
Sep. 8, 2020 International Search Report issued in International Patent Application No. PCT/JP2020/028746.

* cited by examiner

POWER TOOL

FIELD

The present disclosure relates to a power tool.

BACKGROUND

In a technical field related to a power tool, an electric power tool including a torque sensor as disclosed in Patent Literature 1 are known.

CITATION LIST

Patent Literature

Patent Literature 1: Japanese Patent Application Laid-open No. 2018-122429

SUMMARY

Technical Problem

In an assembly process of a product, screwing work using a power tool is performed. The power tool includes an electric power tool or a pneumatic tool. The electric power tool refers to a tool that uses an electric motor as a power source. The pneumatic tool refers to a tool that uses an air motor driven by compressed air as a power source. For management of products, a detection signal of a torque sensor is recorded during the screwing work in some cases. The power tool is sometimes provided with an amplifier circuit configured to amplify the detection signal of the torque sensor. To properly record the detection signal of the torque sensor, it is necessary to suppress influence of noise on the detection signal output from the torque sensor to the amplifier circuit.

An object of the present disclosure is to suppress influence of noise on the detection signal output from the torque sensor unit to the amplifier circuit.

Solution to Problem

According to the present disclosure, there is provided a power tool that includes: a motor including a rotor and a stator disposed around the rotor; an output shaft to which a tip tool is attached and that is rotated by power generated by the motor; a torque sensor unit that is disposed between the stator and the output shaft in a front-rear direction parallel to a rotation axis of the motor and that is coupled to the output shaft; an amplifier circuit that amplifies a detection signal of the torque sensor unit; and a housing that includes a motor housing part configured to house the motor and a grip part. The torque sensor unit is disposed forward of the stator. The grip part is disposed downward of the motor housing part. The amplifier circuit is disposed upward of the grip part. The amplifier circuit is disposed forward of a rear end part of the stator.

Advantageous Effects of Invention

According to the present disclosure, it is possible to suppress influence of noise on the detection signal output from the torque sensor unit to the amplifier circuit.

DESCRIPTION OF EMBODIMENTS

Embodiments according to the present disclosure will be described below with reference to the accompanying drawings. However, the present disclosure is not limited to the embodiments. Structural elements of the embodiments explained below can be combined with one another as appropriate. Moreover, some of the structural elements may not be used.

In the embodiments, the positional relation among parts will be described using terms such as left, right, front, rear, up, and down. These terms indicate relative position or direction, in which the center of a power tool serves as a reference. In the embodiment, the power tool is an electric power tool 1 including a motor 6, which is an electric motor.

In the embodiments, a direction parallel to a rotation axis AX of the motor 6 is appropriately referred to as an axial direction. A direction that goes around the rotation axis AX is appropriately referred to as a circumferential direction or a rotation direction. A radiation direction of the rotation axis AX is appropriately referred to as a radial direction.

In the embodiments, the rotation axis AX extends in a front-rear direction. The axial direction and the front-rear direction coincide with each other. One side in the axial direction is forward, and the other side in the axial direction is rearward. Moreover, in the radial direction, a position close to or a direction approaching the rotation axis AX is appropriately referred to as a radially inner side, and a position far from or a direction away from the rotation axis AX is appropriately referred to as a radially outer side.

Electric Power Tool

Figure 1:
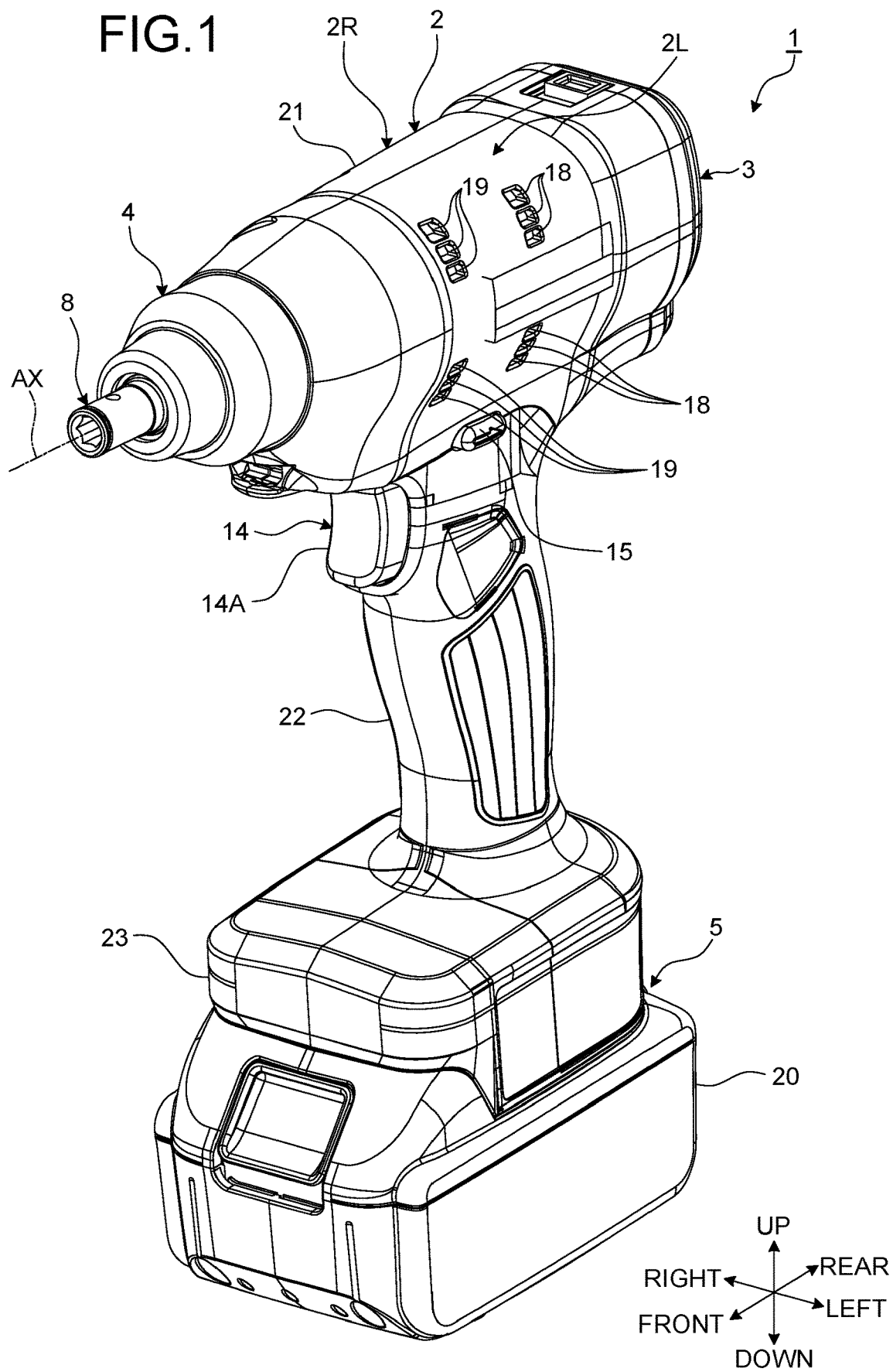
FIG. 1 is a perspective view from the front illustrating an electric power tool according to an embodiment.
Figure 2:
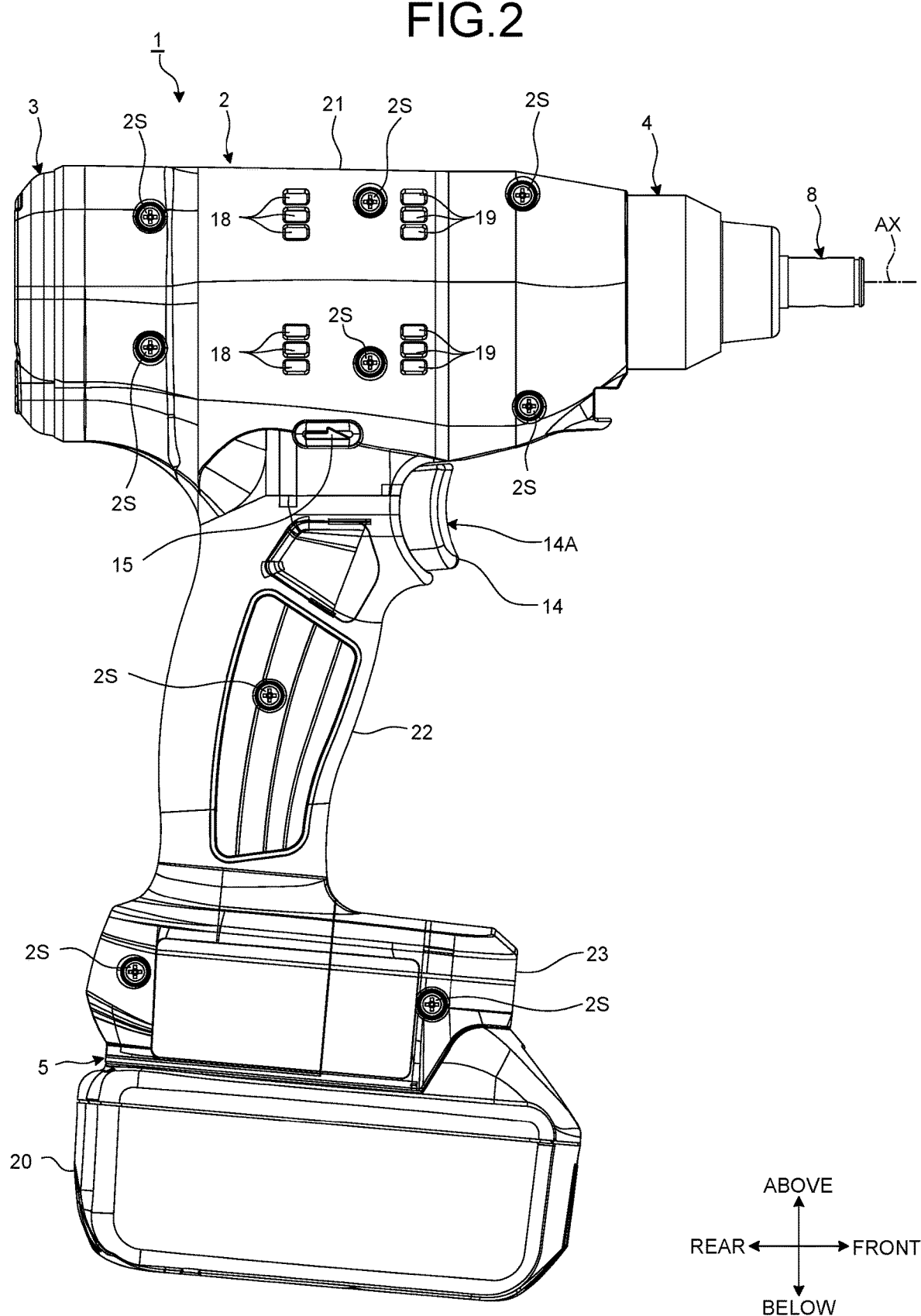
FIG. 2 is a side view illustrating the electric power tool according to the embodiment.
Figure 3:
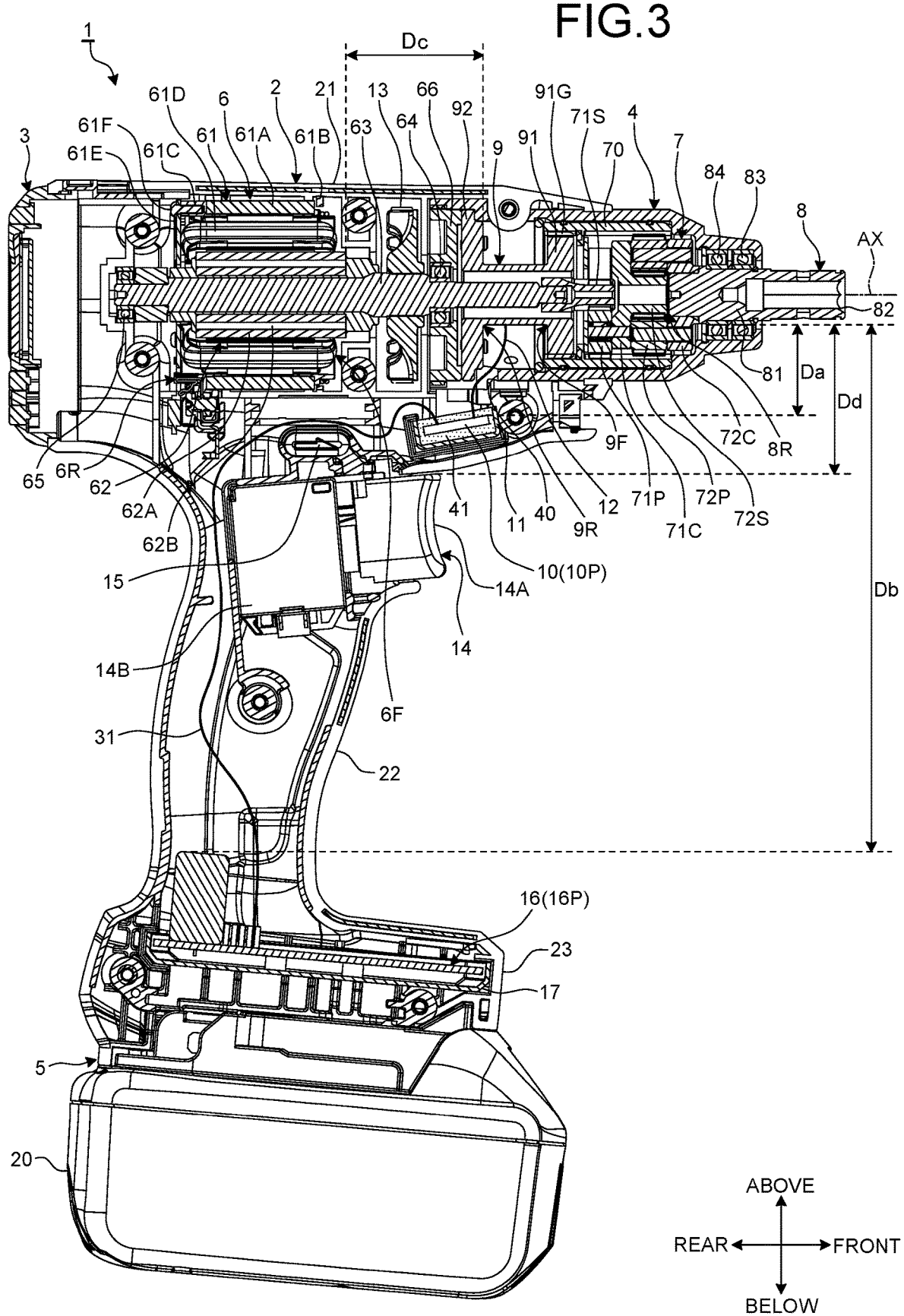
FIG. 3 is a sectional view illustrating the electric power tool according to the embodiment.

FIG. 1 is a perspective view from the front illustrating the electric power tool 1 according to the present embodiment. FIG. 2 is a side view illustrating the electric power tool 1 according to the present embodiment. FIG. 3 is a sectional view illustrating the electric power tool 1 according to the present embodiment. In the present embodiment, the electric power tool 1 is a power driver. The electric power tool 1 is an industrial power driver used in assembly factories. In an assembly process of a product, screwing work using the electric power tool 1 is performed. The assembly factory is, for example, an automobile assembly plant. The product is, for example, an automobile.

As illustrated in FIGS. 1, 2, and 3, the electric power tool 1 includes a housing 2, a rear cover 3, a gear case 4, a battery mounting part 5, the motor 6, a planetary gear mechanism 7, an output shaft 8, a torque sensor unit 9, an amplifier circuit 10, a circuit case 11, a lead line 12, a fan 13, a trigger switch 14, a forward-reverse change lever 15, a controller 16, and a controller case 17.

The housing 2 is made of synthetic resin. The housing 2 includes a left housing 2L and a right housing 2R. The left housing 2L and the right housing 2R are fixed to each other with screws 2S. The housing 2 is formed by fixing the left housing 2L and the right housing 2R.

The housing 2 includes a motor housing part 21, a grip part 22, and a controller housing part 23.

The motor housing part 21 houses the motor 6. The motor housing part 21 is formed in a tubular shape. The motor housing part 21 is disposed above the grip part 22.

The grip part 22 is configured to be gripped by a hand of a worker. The grip part 22 is disposed downward of the motor housing part 21. The grip part 22 protrudes downward from the motor housing part 21. The trigger switch 14 is disposed on the grip part 22.

The controller housing part 23 houses the controller 16. The controller housing part 23 is disposed downward of the grip part 22. The controller housing part 23 is connected to a lower end part of the grip part 22. The dimensions of the outer shape of the controller housing part 23 in both the front-rear direction and the left-right direction are larger than the dimensions of the outer shape of the grip part 22.

The rear cover 3 is made of synthetic resin. The rear cover 3 is disposed on a rear portion of the motor housing part 21. The rear cover 3 is disposed so as to cover an opening of the rear portion of the motor housing part 21. The rear cover 3 is fixed to the motor housing part 21 with screws.

The motor housing part 21 includes an inlet port 18 and an exhaust port 19. The air in the space outside the housing 2 flows into the space inside the housing 2 via the inlet port 18. The air in the space inside the housing 2 flows out to the space outside the housing 2 via the exhaust port 19.

The gear case 4 accommodates the torque sensor unit 9, the planetary gear mechanism 7, and at least a part of the output shaft 8. The gear case 4 is disposed forward of the motor 6. The gear case 4 is formed in a tubular shape. The gear case 4 is made of metal. In the present embodiment, the gear case 4 is made of aluminum. The gear case 4 is disposed so as to cover an opening at a front portion of the motor housing part 21. The gear case 4 is fixed to the motor housing part 21. The rear portion of the gear case 4 is disposed inside the motor housing part 21. At least a part of the motor housing part 21 is disposed around the gear case 4. The front portion of the gear case 4 is disposed forward of the motor housing part 21.

The battery mounting part 5 is formed at a lower portion of the controller housing part 23. The battery mounting part 5 is connected to a battery pack 20. The battery pack 20 is mountable on the battery mounting part 5. The battery pack 20 is detachably attached to the battery mounting part 5. The battery pack 20 includes a secondary battery. In the present embodiment, the battery pack 20 includes a rechargeable lithium ion battery. When mounted on the battery mounting part 5, the battery pack 20 can supply electrical power to the electric power tool 1. The motor 6 is driven based on the electrical power supplied from the battery pack 20. The amplifier circuit 10 and the controller 16 operate based on the electrical power supplied from the battery pack 20.

The motor 6 is a power source of the electric power tool 1. The motor 6 is an inner-rotor-type brushless motor. The motor 6 is housed in the motor housing part 21. The motor 6 includes a tubular-shaped stator 61 and a rotor 62 disposed inside the stator 61. The stator 61 is disposed around the rotor 62. The rotor 62 includes a rotor shaft 63 that extends in the axial direction.

The stator 61 includes a stator core 61A including a plurality of stacked steel plates, a front insulator 61B disposed on the front portion of the stator core 61A, a rear insulator 61C disposed on the rear portion of the stator core 61A, a plurality of coils 61D wounded on the stator core 61A through the front insulator 61B and the rear insulator 61C, a sensor circuit board 61E supported by the rear insulator 61C, and a short circuit member 61F supported by the rear insulator 61C. The sensor circuit board 61E includes a plurality of rotation detection elements configured to detect the rotation of the rotor 62. The short circuit member 61F connects the coils 61D through fusing terminals. The short circuit member 61F is connected to the controller 16 through a lead line (not illustrated).

The rotor 62 rotates about the rotation axis AX. The rotor 62 includes the rotor shaft 63, a rotor core 62A disposed around the rotor shaft 63, and a plurality of permanent magnets 62B held in the rotor core 62A. The rotor core 62A is formed in a cylindrical shape. The rotor core 62A includes a plurality of stacked steel plates. The rotor core 62A has a through hole extending in the axial direction. A plurality of the through holes are formed in the circumferential direction. The permanent magnets 62B are respectively disposed in the through holes of the rotor core 62A.

The rotation detection elements of the sensor circuit board 61E detect the rotation of the rotor 62, by detecting the magnetic fields of the permanent magnets 62B. The controller 16 supplies drive currents to the coils 61D based on detection signals of the rotation detection elements.

The rotor shaft 63 rotates about the rotation axis AX. The rotation axis AX of the rotor shaft 63 coincides with the rotation axis of the output shaft 8. A front portion of the rotor shaft 63 is rotatably supported by a bearing 64. A rear portion of the rotor shaft 63 is rotatably supported by a bearing 65. The bearing 64 is held in a bearing box 66. The bearing box 66 is disposed forward of the fan 13. The bearing box 66 is disposed inside the gear case 4. The bearing box 66 is fixed to the gear case 4. The bearing 65 is held by the rear cover 3. The front end part of the rotor shaft 63 is disposed forward of the bearing 64. The front end part of the rotor shaft 63 is disposed in the space inside the gear case 4.

A pinion gear 71S is provided at the front end part of the rotor shaft 63. The rotor shaft 63 is coupled to the planetary gear mechanism 7 via the pinion gear 71S.

The planetary gear mechanism 7 is accommodated in the gear case 4. The planetary gear mechanism 7 couples the rotor shaft 63 and the output shaft 8. The planetary gear mechanism 7 decelerates the rotation of the rotor shaft 63 and rotates the output shaft 8 at a rotation speed lower than that of the rotor shaft 63. The planetary gear mechanism 7 functions as a power transmission mechanism configured to transmit the power generated by the motor 6 to the output shaft 8. The planetary gear mechanism 7 includes a plurality of gears. The planetary gear mechanism 7 is disposed forward of the torque sensor unit 9.

Figure 4:
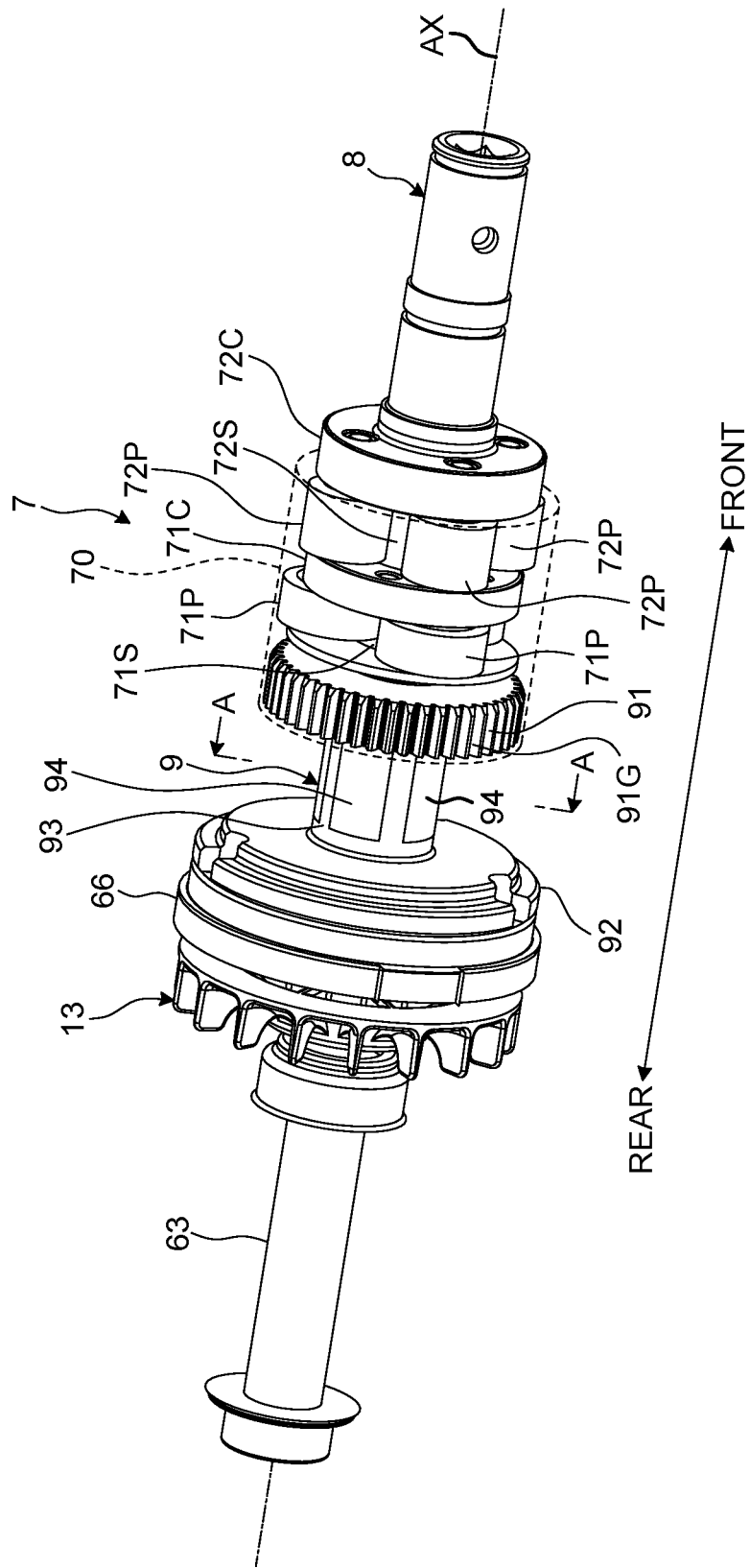
FIG. 4 is an extracted perspective view of the vicinity of a planetary gear mechanism according to the embodiment.

FIG. 4 is an extracted perspective view of the vicinity of the planetary gear mechanism 7 according to the present embodiment. As illustrated in FIGS. 3 and 4, the planetary gear mechanism 7 includes a plurality of planetary gears 71P disposed around the pinion gear 71S, a carrier 71C that supports the planetary gears 71P, a sun gear 72S disposed forward of the carrier 71C, a plurality of planetary gears 72P disposed around the sun gear 72S, a carrier 72C that supports the planetary gears 72P, and an internal gear 70 disposed around the planetary gears 72P.

The planetary gears 71P mesh with the pinion gear 71S. The carrier 71C supports the planetary gears 71P so that they are rotatable relative to the carrier 71C. The sun gear 72S is disposed forward of the carrier 71C. The diameter of the sun gear 72S is smaller than the diameter of the carrier 71C. The carrier 71C and the sun gear 72S are integrally formed. The carrier 71C and the sun gear 72S rotate together.

The rotor shaft 63 is coupled to the sun gear 72S via the pinion gear 71S, the planetary gears 71P, and the carrier 71C. The sun gear 72S is rotated by the power generated by the motor 6. The internal gear 70 is disposed around the sun gear 72S. The planetary gears 72P are disposed between the sun gear 72S and the internal gear 70 in the radial direction. The planetary gears 72P mesh with the sun gear 72S. The planetary gears 72P mesh with the internal gear 70. The carrier 72C supports the planetary gears 72P so that they are rotatable relative to the carrier 72C.

The carrier 72C is connected to the output shaft 8. The carrier 72C is rotatable about the rotation axis AX. The internal gear 70 is disposed inside the gear case 4. The internal gear 70 does not rotate. The internal gear 70 is coupled to the torque sensor unit 9.

When the rotor shaft 63 is rotated by the drive of the motor 6, the pinion gear 71S rotates, and the planetary gears 71P revolve around the pinion gear 71S. With the revolution of the planetary gears 71P, the carrier 71C and the sun gear 72S rotate at a rotation speed lower than the rotation speed of the rotor shaft 63. When the sun gear 72S rotates, the planetary gears 72P revolve around the sun gear 72S. With the revolution of the planetary gears 72P, the carrier 72C rotates at a rotation speed lower than the rotation speed of the carrier 71C. In this manner, when the motor 6 is driven, the carrier 72C rotates at a rotation speed lower than that of the rotor shaft 63.

The output shaft 8 is rotated with a tip tool attached to the output shaft 8, by the power generated by the motor 6. The output shaft 8 rotates based on the power transmitted from the motor 6 via the planetary gear mechanism 7. At least a part of the output shaft 8 is disposed forward of the planetary gear mechanism 7. The output shaft 8 includes a spindle 81 that rotates about the rotation axis AX based on the power transmitted from the motor 6, and a chuck 82 to which the tip tool is attached.

The spindle 81 is connected to the carrier 72C. With the rotation of the carrier 72C, the spindle 81 rotates about the rotation axis AX.

The spindle 81 is rotatably supported by a bearing 83 and a bearing 84. The chuck 82 is capable of holding a tip tool. The chuck 82 is disposed at the front portion of the spindle 81. The chuck 82 rotates as the spindle 81 rotates. The chuck 82 rotates with the tip tool held by the chuck 82.

The torque sensor unit 9 is accommodated in the gear case 4. The torque sensor unit 9 is coupled to the output shaft 8. In the present embodiment, the torque sensor unit 9 is coupled to the output shaft 8 via the planetary gear mechanism 7. The torque sensor unit 9 detects torque applied to the output shaft 8. While the tip tool is held by the chuck 82, a screwing work is performed. Torque detected by the torque sensor unit 9 includes screwing torque applied to the output shaft 8 during the screwing work.

In the front-rear direction, which is parallel to the rotation axis AX of the motor 6, the torque sensor unit 9 is disposed between a front end part 6F of the stator 61 and a rear end part 8R of the output shaft 8. The torque sensor unit 9 is disposed forward of the stator 61. The output shaft 8 is disposed forward of the torque sensor unit 9. In the present embodiment, the torque sensor unit 9 is disposed between the bearing 64 that supports the front portion of the rotor shaft 63 and the planetary gear mechanism 7.

Figure 5:
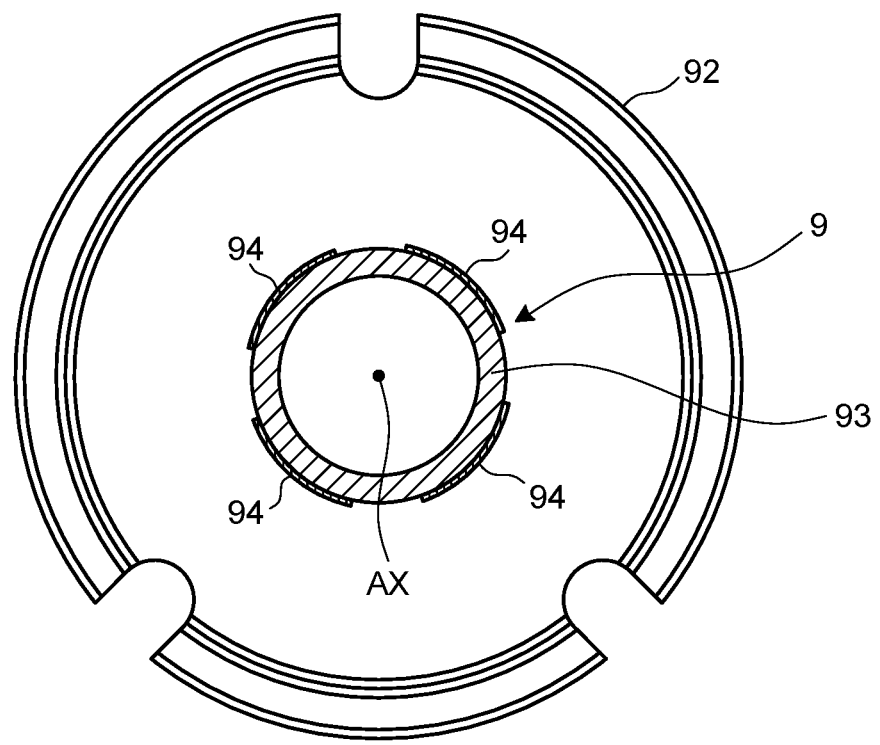
FIG. 5 is a sectional view illustrating a torque sensor unit according to the embodiment.

FIG. 5 is a sectional view illustrating the torque sensor unit 9 according to the present embodiment. FIG. 5 corresponds to a sectional arrow view taken along the line A-A in FIG. 4. The torque sensor unit 9 includes a tubular-shaped base part 93 having a small diameter, and a strain gauge 94 fixed to the surface of the base part 93. Four of the strain gauges 94 are provided in the circumferential direction. The four strain gauges 94 are disposed at regular intervals of 90 degrees.

The torque sensor unit 9 is disposed around the rotor shaft 63. The front end part of the rotor shaft 63 is disposed forward of a front end part 9F of the torque sensor unit 9. The pinion gear 71S is disposed on the front end part of the rotor shaft 63. The pinion gear 71S is disposed forward of the front end part 9F of the torque sensor unit 9.

The torque sensor unit 9 is coupled to the internal gear 70 of the planetary gear mechanism 7. A first flange part 91 is connected to the front end part 9F of the base part 93 of the torque sensor unit 9. The first flange part 91 and the base part 93 of the torque sensor unit 9 are integrally formed. The diameter of the first flange part 91 is larger than that of the torque sensor unit 9. A gear 91G is provided on the outer surface of the first flange part 91. The internal gear 70 is disposed around the first flange part 91. The internal gear 70 meshes with the gear 91G provided on the first flange part 91. The torque sensor unit 9 is coupled to the internal gear 70 via the first flange part 91.

A second flange part 92 is connected to a rear end part 9R of the base part 93 of the torque sensor unit 9. The second flange part 92 and the base part 93 of the torque sensor unit 9 are integrally formed. The diameter of the second flange part 92 is larger than that of the torque sensor unit 9. The gear case 4 is disposed around the second flange part 92. The second flange part 92 is fixed to the gear case 4.

In the screwing work, when a screw is screwed into a work target, the torque applied to the output shaft 8 increases. The torque applied to the output shaft 8 is transmitted to the internal gear 70 via the carrier 72C and the planetary gear 72P. The torque applied to the internal gear 70 is transmitted to the torque sensor unit 9 via the first flange part 91. The rear end part 9R of the torque sensor unit 9 is fixed to the gear case 4 via the second flange part 92. The base part 93 of the torque sensor unit 9 is twisted in the rotation direction by the internal gear 70. The first flange part 91 and the second flange part 92 also receive torque. However, each of the first flange part 91 and the second flange part 92 has a larger diameter than the torque sensor unit 9. Thus, the torsional deformation of the first flange part 91 and the second flange part 92 is smaller than the torsional deformation of the torque sensor unit 9. When the torque sensor unit 9 is twisted in the rotation direction, the four strain gauges 94 fixed to the surface of the base part 93 are deformed. When the strain gauges 94 are deformed, a detection signal (voltage) indicating the torque applied to the torque sensor unit 9 is output from the torque sensor unit 9 to the controller 16 via the amplifier circuit 10. The controller 16 can calculate the torque applied to the output shaft 8 based on the detection signal output from the torque sensor unit 9. In this manner, the torque sensor unit 9 can output the detection signal indicating the torque applied to the output shaft 8.

The amplifier circuit 10 amplifies the detection signal (voltage) of the torque sensor unit 9. The amplifier circuit 10 is provided on a substrate 10P. The electronic components constituting the amplifier circuit 10 are mounted on the substrate 10P. The wiring constituting the amplifier circuit 10 is provided on the substrate 10P.

The circuit case 11 accommodates the substrate 10P including the amplifier circuit 10. The circuit case 11 is made of synthetic resin. The circuit case 11 includes a bottom plate and a side plate that protrudes upward from the peripheral edge part of the bottom plate. A synthetic resin part 41 is filled into the circuit case 11. The substrate 10P is disposed inside the synthetic resin part 41. The substrate 10P including the amplifier circuit 10 is molded with synthetic resin inside the circuit case 11.

The lead line 12 connects the torque sensor unit 9 and the amplifier circuit 10. The detection signal of the torque sensor unit 9 is output to the amplifier circuit 10 via the lead line 12. The gear case 4 has an opening 40 in which at least a part of the lead line 12 is disposed.

The amplifier circuit 10 transmits the amplified detection signal (voltage) of the torque sensor unit 9 to the controller 16. The detection signal (voltage) output from the amplifier circuit 10 to the controller 16 is higher than the detection signal (voltage) output from the torque sensor unit 9 to the amplifier circuit 10. A lead line 31 that connects the amplifier circuit 10 and the controller 16 is provided. The detection signal (voltage) of the torque sensor unit 9 output from the amplifier circuit 10 is transmitted to the controller 16 via the lead line 31.

The fan 13 is disposed forward of the motor 6. The fan 13 generates airflow for cooling the motor 6. The fan 13 is fixed to the rotor shaft 63. The fan 13 is rotated by the rotation of the rotor shaft 63. With the rotation of the fan 13, the air in the external space of the housing 2 flows into the internal space of the housing 2 through the inlet port 18. The air that has flowed into the internal space of the housing 2 circulates in the internal space of the housing 2 to cool the motor 6. The air that has flowed through the internal space of the housing 2 flows out to the external space of the housing 2 through the exhaust port 19.

The trigger switch 14 is manipulated to start the motor 6. The trigger switch 14 is disposed on the grip part 22. The trigger switch 14 includes a trigger member 14A and a switch circuit 14B. The switch circuit 14B is housed in the grip part 22. The trigger member 14A protrudes forward from the upper portion on a front portion of the grip part 22. The trigger member 14A is manipulated by a worker. Drive and stop of the motor 6 are switched upon the manipulation of the trigger member 14A.

The forward/reverse change lever 15 is provided on the upper portion of the grip part 22. The forward/reverse change lever 15 is manipulated by the worker. When the forward/reverse change lever 15 is manipulated, the rotation direction of the motor 6 is switched from one to the other of a forward direction and a reverse direction, and vice versa. When the rotation direction of the motor 6 is switched, the rotation direction of the output shaft 8 is switched.

The controller 16 includes a computer system. The controller 16 outputs a control command for controlling the motor 6. The controller 16 is housed in the controller housing part 23. The controller 16 includes a substrate 16P on which a plurality of electronic components are mounted. Examples of the electronic components mounted on the substrate 16P include a processor such as a central processing unit (CPU), a non-volatile memory such as a read only memory (ROM) or storage, a volatile memory such as a random access memory (RAM), a transistor, capacitor, and resistor.

In the screwing work, the controller 16 controls the motor 6 such that the screw is screwed into the work target at a target torque. The controller 16 controls the motor 6 based on the detection signal of the torque sensor unit 9. The target torque is registered in the controller 16. In the screwing work, the controller 16 starts the motor 6 to rotate the output shaft 8 based on an operation signal of the trigger switch 14. The torque applied to the output shaft 8 is detected by the torque sensor unit 9. The controller 16 acquires the detection signal of the torque sensor unit 9. As described above, the controller 16 can calculate the torque applied to the output shaft 8 based on the detection signal output from the torque sensor unit 9. When it is determined that the torque applied to the output shaft 8 has reached the target torque, based on the detection signal of the torque sensor unit 9, the controller 16 stops driving the motor 6. Consequently, the controller 16 can control the motor 6 such that the screw is screwed into the work target at the target torque based on the detection signal of the torque sensor unit 9.

In the present embodiment, the electric power tool 1 includes a wireless communication device. The wireless communication device is disposed at a predetermined section of the housing 2. The wireless communication device is capable of performing short-range wireless communication in a communication scheme that does not require a wireless license. The wireless communication device is capable of performing wireless communication in a communication scheme compliant with, for example, IEEE802.15.1 standard, which is standardized by Institute of Electrical and Electronics Engineers (IEEE).

The controller 16 outputs the detection signal of the torque sensor unit 9 to the wireless communication device. The wireless communication device transmits the detection signal of the torque sensor unit 9 to a management computer disposed outside the electric power tool 1. The management computer records the detection signal of the torque sensor unit 9 during the screwing work.

The controller case 17 accommodates the substrate 16P including the controller 16. The controller case 17 is disposed in the internal space of the controller housing part 23. At least a part of the controller 16 is housed in the controller case 17.

Position of Amplifier Circuit

The detection signal of the torque sensor unit 9 is output to the amplifier circuit 10 via the lead line 12. To suppress influence of noise on the detection signal output from the torque sensor unit 9 to the amplifier circuit 10, the amplifier circuit 10 is disposed at a predetermined position with respect to the torque sensor unit 9. To suppress the detection signal output from the torque sensor unit 9 to the amplifier circuit 10 from being affected by noise, the length of the lead line 12 is preferably short. The amplifier circuit 10 is disposed at a predetermined position with respect to the torque sensor unit 9 such that the length of the lead line 12 is shortened.

The lead line 31 that connects the amplifier circuit 10 and the controller 16 is not significantly affected by noise. This is because when the same level of noise acts on each of the lead line 12 and the lead line 31, the voltage before amplification is affected relatively large, and the voltage after amplification (higher voltage) is affected relatively small. Thus, when the torque sensor unit 9 and the controller 16 are separated from each other by a predetermined distance, it is important that the length of the lead line 12 that connects the torque sensor unit 9 and the amplifier circuit 10 is short, but it is relatively unimportant that the length of the lead line 31 that connects the amplifier circuit 10 and the controller 16 is short.

In the vertical direction, the amplifier circuit 10 is disposed upward of the grip part 22.

In the front-rear direction, the amplifier circuit 10 is disposed forward of a rear end part 6R of the stator 61. In the front-rear direction, the amplifier circuit 10 may be disposed between the front end part 6F of the stator 61 and the rear end part 8R of the output shaft 8.

In the front-rear direction, the amplifier circuit 10 may be disposed between the front end part 6F of the stator 61 and the front end part 9F of the torque sensor unit 9. In the embodiment, the amplifier circuit 10 is disposed in at least a part of the periphery of the torque sensor unit 9.

The distance Da between the amplifier circuit 10 and the torque sensor unit 9 is shorter than the distance db between the controller 16 and the torque sensor unit 9.

The distance Da between the amplifier circuit 10 and the torque sensor unit 9 is shorter than the distance Dc between the motor 6 and the torque sensor unit 9.

In the vertical direction, the amplifier circuit 10 is disposed between the torque sensor unit 9 and the trigger switch 14. The distance Da between the amplifier circuit 10 and the torque sensor unit 9 is shorter than distance Dd between the trigger switch 14 and the torque sensor unit 9.

The distance Da is the shortest distance between the amplifier circuit 10 and the torque sensor unit 9. The distance db is the shortest distance between the controller 16 and the torque sensor unit 9. The distance Dc is the shortest distance between the motor 6 and the torque sensor unit 9. The distance Dd is the shortest distance between the trigger switch 14 and the torque sensor unit 9.

In the embodiment, the amplifier circuit 10 and the circuit case 11 that accommodates the amplifier circuit 10 are housed in the motor housing part 21. The circuit case 11 is fixed to the inner surface of the motor housing part 21.

The motor housing part 21 is formed in a tubular shape. At least a part of the motor housing part 21 is disposed around the gear case 4. In the embodiment, the front portion of the motor housing part 21 is disposed around the gear case 4. The amplifier circuit 10 is disposed between the motor housing part 21 and the gear case 4 in the radial direction.

The amplifier circuit 10 is disposed at a position facing the opening 40 of the gear case 4. In the embodiment, the opening 40 is formed in the lower portion of the gear case 4. The amplifier circuit 10 is disposed downward of the gear case 4 so as to face the opening 40.

In the left-right direction, the center position of the substrate 10P including the amplifier circuit 10 and the center position of the torque sensor unit 9 coincide with each other.

Effects

As described above, according to the embodiment, in the front-rear direction, the torque sensor unit 9 is disposed between the stator 61 and the output shaft 8. The torque sensor unit 9 is disposed forward of the stator 61. The output shaft 8 is disposed forward of the torque sensor unit 9. The grip part 22 is disposed downward of the motor housing part 21. The amplifier circuit 10 is disposed upward of the grip part 22. The amplifier circuit 10 is disposed forward of the rear end part 6R of the stator 61. The amplifier circuit 10 is disposed in the vicinity of the torque sensor unit 9, and the distance between the torque sensor unit 9 and the amplifier circuit 10 is shortened, so that the detection signal output from the torque sensor unit 9 to the amplifier circuit 10 is suppressed from being affected by noise.

By disposing the amplifier circuit 10 between the front end part 6F of the stator 61 and the rear end part 8R of the output shaft 8 in the front-rear direction, the distance between the torque sensor unit 9 and the amplifier circuit 10 is shortened. Thus, the detection signal output from the torque sensor unit 9 to the amplifier circuit 10 is suppressed from being affected by noise.

By disposing the amplifier circuit 10 between the front end part 6F of the stator 61 and the front end part 9F of the torque sensor unit 9 in the front-rear direction, the distance between the torque sensor unit 9 and the amplifier circuit 10 is shortened. Thus, the detection signal output from the torque sensor unit 9 to the amplifier circuit 10 is suppressed from being affected by noise.

By disposing the amplifier circuit 10 in at least a part of the periphery of the torque sensor unit 9, the distance between the torque sensor unit 9 and the amplifier circuit 10 is shortened. Thus, the detection signal output from the torque sensor unit 9 to the amplifier circuit 10 is suppressed from being affected by noise.

The distance Da between the amplifier circuit 10 and the torque sensor unit 9 is shorter than the distance db between the controller 16 and the torque sensor unit 9. Because the distance Da is shorter than the distance db, the detection signal output from the torque sensor unit 9 to the amplifier circuit 10 is suppressed from being affected by noise.

The distance Da between the amplifier circuit 10 and the torque sensor unit 9 is shorter than the distance Dc between the motor 6 and the torque sensor unit 9. Because the distance Da is shorter than the distance Dc, the detection signal output from the torque sensor unit 9 to the amplifier circuit 10 is suppressed from being affected by noise.

By housing the amplifier circuit 10 in the motor housing part 21, the distance between the torque sensor unit 9 and the amplifier circuit 10 is shortened. Thus, the detection signal output from the torque sensor unit 9 to the amplifier circuit 10 is suppressed from being affected by noise.

The torque sensor unit 9 is housed in the gear case 4. By disposing the amplifier circuit 10 between the motor housing part 21 and the gear case 4 in the radial direction, the distance between the torque sensor unit 9 and the amplifier circuit 10 is shortened. Thus, the detection signal output from the torque sensor unit 9 to the amplifier circuit 10 is suppressed from being affected by noise.

By providing the opening 40 in which at least a part of the lead line 12 is disposed in the gear case 4, the torque sensor unit 9 and the amplifier circuit 10 are connected via the lead line 12.

The amplifier circuit 10 is disposed at a position facing the opening 40. Consequently, it is possible to shorten the length of the lead line 12. Thus, the detection signal output from the torque sensor unit 9 to the amplifier circuit 10 is suppressed from being affected by noise.

The distance Da between the amplifier circuit 10 and the torque sensor unit 9 is shorter than the distance Dd between the trigger switch 14 and the torque sensor unit 9. Because the distance Da is shorter than the distance Dd, the detection signal output from the torque sensor unit 9 to the amplifier circuit 10 is suppressed from being affected by noise.

The trigger switch 14 is disposed on the grip part 22. The amplifier circuit 10 is disposed upward of the trigger switch 14. In the vertical direction, the amplifier circuit 10 is disposed between the torque sensor unit 9 and the trigger switch 14. Because the amplifier circuit 10 is disposed at a position closer to the torque sensor unit 9 than the trigger switch 14, the detection signal output from the torque sensor unit 9 to the amplifier circuit 10 is suppressed from being affected by noise.

The amplifier circuit 10 is provided on the substrate 10P. In the left-right direction, the center position of the substrate 10P and the center position of the torque sensor unit 9 coincide with each other. Consequently, the size of the electric power tool 1 in the left-right direction is suppressed from being increased.

The substrate 10P including the amplifier circuit 10 is housed in the circuit case 11. The amplifier circuit 10 is protected by the circuit case 11.

The substrate 10P including the amplifier circuit 10 is molded with synthetic resin inside the circuit case 11. The substrate 10P is disposed inside the synthetic resin part 41. The amplifier circuit 10 is protected by the synthetic resin part 41.

The circuit case 11 is fixed to the motor housing part 21. Consequently, the amplifier circuit 10 is suppressed from moving inside the housing 2.

The torque sensor unit 9 is coupled to the output shaft 8 via the planetary gear mechanism 7. Consequently, the torque applied to the output shaft 8 is transmitted to the torque sensor unit 9 via the planetary gear mechanism 7.

The planetary gear mechanism 7 includes the sun gear 72S that is rotated by the power generated by the motor 6, the internal gear 70 disposed around the sun gear 72S, the planetary gears 72P disposed between the sun gear 72S and the internal gear 70, and the carrier 72C that supports the planetary gears 72P. The carrier 72C is connected to the output shaft 8. The internal gear 70 is coupled to the torque sensor unit 9. Consequently, the power generated by the motor 6 is transmitted to the output shaft 8, and the torque applied to the output shaft 8 is transmitted to the torque sensor unit 9.

The torque sensor unit 9 is formed in a tubular shape and is disposed around the rotor shaft 63. The front end part of the rotor shaft 63 is coupled to the sun gear 72S via the pinion gear 71S, the planetary gear 71P, and the carrier 71C. Consequently, the size of the electric power tool 1 in the front-rear direction is prevented from being increased.

The first flange part 91 is connected to the front end part of the torque sensor unit 9, and the second flange part 92 is connected to the rear end part of the torque sensor unit 9. The internal gear 70 meshes with the gear 91G provided on the first flange part 91. The torque sensor unit 9 is coupled to the internal gear 70 via the first flange part 91. The second flange part 92 is fixed to the gear case 4. Thus, when torque is applied to the output shaft 8, the torque sensor unit 9 can receive torque from the internal gear 70 so as to be twisted in the rotation direction. Thus, the torque sensor unit 9 can detect the torque applied to the output shaft 8 in a favorable manner.

Other Embodiments

In the embodiment described above, the amplifier circuit 10 is disposed downward of the torque sensor unit 9. Alternatively, the amplifier circuit 10 may be disposed upward of the torque sensor unit 9, may be disposed on the left side of the torque sensor unit 9, or may be disposed on the right side of the torque sensor unit 9.

In the embodiment described above, the amplifier circuit 10 may be disposed in at least a part of the periphery of the motor 6. In the front-rear direction, the amplifier circuit 10 may be disposed between the rear end part 6R of the stator 61 and the front end part 6F of the stator 61. The amplifier circuit 10 may be disposed downward of the motor 6, may be disposed upward of the motor 6, may be disposed on the left side of the motor 6, or may be disposed on the right side of the motor 6.

In the embodiment described above, the amplifier circuit 10 may be disposed between the front end part 6F of the stator 61 and the rear end part 9R of the torque sensor unit 9.

In the embodiment described above, the amplifier circuit 10 may be disposed forward of the front end part 9F of the torque sensor unit 9.

In the embodiment described above, the power driver is used as an example of the electric power tool 1. However, the electric power tool 1 may only need to include the motor 6 and the output shaft 8 rotated by the power generated by the motor 6. The electric power tool 1 may be at least one of a vibration driver drill, a grinder, an angle drill, an impact driver, a hammer drill, a circular saw, and a reciprocating saw. When the torque sensor unit 9 and the amplifier circuit 10 that amplifies the detection signal of the torque sensor unit 9 are provided in such an electric power tool 1, by disposing the amplifier circuit 10 in at least a part of the periphery of the torque sensor unit 9, the detection signal output from the torque sensor unit 9 to the amplifier circuit 10 is suppressed from being affected by noise.

In the embodiment described above, the battery pack 20 mounted on the battery mounting part 5 is used as the power source of the electric power tool 1. A commercial power source (AC power source) may be used as the power source of the electric power tool 1.

In the embodiment described above, the power tool is the electric power tool 1 that uses the motor 6, which is the electric motor, as a power source. However, the power tool may be a pneumatic tool that uses an air motor as a power source. Moreover, the power source of the power tool is not limited to the electric motor or the air motor, and may be another power source. For example, the power source of the power tool may be a hydraulic motor, or a motor driven by engine.

REFERENCE SIGNS LIST 1 electric power tool (power tool)
2 housing
2L left housing
2R right housing
2S screw
3 rear cover
4 gear case
5 battery mounting part
6 motor
6F front end part
6R rear end part
7 planetary gear mechanism
8 output shaft
8R rear end part
9 torque sensor unit
9F front end part
9R rear end part
10 amplifier circuit
10P substrate
11 circuit case
12 lead line
13 fan
14 trigger switch
14A trigger member
14B switch circuit
15 forward/reverse change lever
16 controller
16P substrate
17 controller case
18 inlet port
19 exhaust port
20 battery pack
21 motor housing part
22 grip part
23 controller housing part
31 lead line 40 opening
41 synthetic resin part
61 stator
61A stator core
61B front insulator
61C rear insulator
61D coil
61E sensor circuit board
61F short circuit member
62 rotor
62A rotor core
62B permanent magnet
63 rotor shaft
64 bearing
65 bearing
66 bearing box
70 internal gear
71C carrier
71P planetary gear
71S pinion gear
72C carrier
72P planetary gear
72S sun gear
81 spindle
82 chuck
83 bearing
84 bearing
91 first flange part
91G gear
92 second flange part
93 base part
94 strain gauge
AX rotation axis

The invention claimed is:

1. A power tool, comprising:
a motor including a rotor and a stator;
an output shaft to which a tip tool is attached and that is rotated by power generated by the motor;
a torque sensor unit that is disposed between the stator and the output shaft in a front-rear direction parallel to a rotation axis of the motor and that is coupled to the output shaft;
an amplifier circuit that amplifies a detection signal of the torque sensor unit;
a housing that includes a motor housing part configured to house the motor and a grip part; and
a gear case that accommodates the torque sensor unit, wherein
the torque sensor unit is disposed forward of the stator,
the grip part is disposed downward of the motor housing part,
the amplifier circuit is disposed upward of the grip part,
the amplifier circuit is disposed forward of a rear end part of the stator,
the amplifier circuit is housed in the motor housing part,
at least a part of the motor housing part is disposed around the gear case, and
the amplifier circuit is disposed between the motor housing part and the gear case.

2. The power tool according to claim 1, wherein the amplifier circuit is disposed between a front end part of the stator and a rear end part of the output shaft.

3. The power tool according to claim 2, wherein the amplifier circuit is disposed between the front end part of the stator and a front end part of the torque sensor unit.

4. The power tool according to claim 3, wherein the amplifier circuit is disposed in at least a part of a periphery of the torque sensor unit.

5. The power tool according to claim 1, further comprising:
a controller to which the detection signal output from the amplifier circuit is transmitted, wherein
a distance between the amplifier circuit and the torque sensor unit is shorter than a distance between the controller and the torque sensor unit.

6. The power tool according to claim 1, wherein a distance between the amplifier circuit and the torque sensor unit is shorter than a distance between the motor and the torque sensor unit.

7. The power tool according to claim 1, further comprising:
a lead line that connects the torque sensor unit and the amplifier circuit, wherein
the gear case has an opening in which at least a part of the lead line is disposed.

8. The power tool according to claim 7, wherein the amplifier circuit is disposed at a position facing the opening.

9. The power tool according to claim 1, further comprising:
a trigger switch that is manipulated to start the motor, wherein
a distance between the amplifier circuit and the torque sensor unit is shorter than a distance between the trigger switch and the torque sensor unit.

10. The power tool according to claim 9, wherein the trigger switch is disposed on the grip part.

11. The power tool according to claim 10, wherein
the amplifier circuit is provided on a substrate, and
in a left-right direction, a center position of the substrate and a center position of the torque sensor unit coincide with each other.

12. The power tool according to claim 11, further comprising:
a circuit case that accommodates the substrate.

13. The power tool according to claim 12, further comprising:
a synthetic resin part filled into the circuit case, wherein
the substrate is disposed inside the synthetic resin part.

14. The power tool according to claim 12, wherein the circuit case is fixed to the motor housing part.

15. The power tool according to claim 1, further comprising:
a planetary gear mechanism accommodated in the gear case, wherein
the torque sensor unit is coupled to the output shaft via the planetary gear mechanism.

16. The power tool according to claim 15, wherein
the planetary gear mechanism includes
a sun gear rotated by power generated by the motor,
an internal gear disposed around the sun gear,
a plurality of planetary gears disposed between the sun gear and the internal gear, and
a carrier that supports the planetary gears,
the carrier is connected to the output shaft, and
the internal gear is coupled to the torque sensor unit.

17. The power tool according to claim 16, wherein
the motor includes a rotor shaft,
the torque sensor unit is disposed around the rotor shaft, and
the rotor shaft is coupled to the sun gear.

18. A power tool, comprising:
a motor including a rotor and a stator;
an output shaft to which a tip tool is attached and that is rotated by power generated by the motor;
a torque sensor unit that is disposed between the stator and the output shaft in a front-rear direction parallel to a rotation axis of the motor and that is coupled to the output shaft;
an amplifier circuit that amplifies a detection signal of the torque sensor unit;
a controller that is capable of stopping driving the motor based on a signal from the amplifier circuit;
a housing that includes a motor housing part configured to house the motor and a grip part, and that houses the amplifier circuit and the controller; and
a gear case that accommodates the torque sensor unit, wherein
the amplifier circuit is housed in the motor housing part,
at least a part of the motor housing part is disposed around the gear case, and
the amplifier circuit is disposed between the motor housing part and the gear case.

19. A power tool, comprising:
a motor including a rotor and a stator;
an output shaft to which a tip tool is attached and that is rotated by power generated by the motor;
a torque sensor unit that is disposed between the stator and the output shaft in a front-rear direction parallel to a rotation axis of the motor and that is coupled to the output shaft;
an amplifier circuit that amplifies a detection signal of the torque sensor unit; and
a housing that includes a motor housing part configured to house the motor and a grip part, wherein
a front end part of a rotor shaft of the rotor is disposed forward of a front end part of the torque sensor unit,
the torque sensor unit is disposed forward of the stator,
the grip part is disposed downward of the motor housing part,
the amplifier circuit is disposed upward of the grip part, and
the amplifier circuit is disposed forward of a rear end part of the stator and is disposed rearward of the front end part of the rotor shaft.

20. A power tool, comprising:
a motor including a rotor and a stator;
an output shaft to which a tip tool is attached and that is rotated by power generated by the motor;
a torque sensor unit that is disposed between the stator and the output shaft in a front-rear direction parallel to a rotation axis of the motor and that is coupled to the output shaft;
an amplifier circuit that amplifies a detection signal of the torque sensor unit;
a controller that is capable of stopping driving the motor based on a signal from the amplifier circuit; and
a housing that includes a motor housing part configured to house the motor and a grip part, and that houses the amplifier circuit and the controller, wherein
a front end part of a rotor shaft of the rotor is disposed forward of a front end part of the torque sensor unit, and
the amplifier circuit is disposed forward of a rear end part of the stator and is disposed rearward of the front end part of the rotor shaft.

* * * * *